United States Patent
Perdomo

(10) Patent No.: US 10,813,169 B2
(45) Date of Patent: Oct. 20, 2020

(54) MESH NETWORK DEPLOYMENT KIT

(71) Applicant: goTenna, Inc., Brooklyn, NY (US)

(72) Inventor: Jorge Perdomo, New York, NY (US)

(73) Assignee: goTenna, Inc., Brooklyn, NY (US)

( * ) Notice: Subject to any disclaimer, the term of this patent is extended or adjusted under 35 U.S.C. 154(b) by 0 days.

(21) Appl. No.: 16/360,874

(22) Filed: Mar. 21, 2019

(65) Prior Publication Data

US 2019/0297671 A1 Sep. 26, 2019

Related U.S. Application Data

(60) Provisional application No. 62/646,684, filed on Mar. 22, 2018.

(51) Int. Cl.
| | |
|---|---|
| *H04W 88/02* | (2009.01) |
| *H04W 88/08* | (2009.01) |
| *H04L 12/24* | (2006.01) |
| *H04W 16/20* | (2009.01) |
| *H04W 84/18* | (2009.01) |
| *G06F 8/65* | (2018.01) |
| *G06F 8/61* | (2018.01) |
| *H04W 84/12* | (2009.01) |

(52) U.S. Cl.
CPC .............. *H04W 88/08* (2013.01); *G06F 8/61* (2013.01); *G06F 8/65* (2013.01); *H04L 41/0809* (2013.01); *H04W 16/20* (2013.01); *H04W 84/18* (2013.01); *H04W 84/12* (2013.01)

(58) Field of Classification Search
CPC ..... H04W 24/02; H04W 88/08; H04W 84/18; H04W 16/20; H04L 41/0809; H04L 41/082
See application file for complete search history.

(56) References Cited

U.S. PATENT DOCUMENTS

| | | | | |
|---|---|---|---|---|
| 6,098,131 | A * | 8/2000 | Unger | H05K 7/1435 |
| | | | | 361/679.4 |
| 8,245,143 | B2 * | 8/2012 | Yach | G06F 1/1626 |
| | | | | 715/744 |
| 8,367,235 | B2 * | 2/2013 | Huang | G06F 1/1632 |
| | | | | 429/96 |
| 9,141,139 | B2 * | 9/2015 | Arnouse | G06F 11/1423 |
| 9,804,647 | B2 * | 10/2017 | Nicholas | G06F 1/30 |
| 10,628,037 | B2 * | 4/2020 | Griffin | G06F 1/1626 |
| 2011/0037571 | A1 * | 2/2011 | Johnson, Jr. | G08B 25/12 |
| | | | | 340/10.5 |
| 2015/0185772 | A1 * | 7/2015 | Arnouse | H05K 7/20736 |
| | | | | 361/679.26 |
| 2017/0192928 | A1 * | 7/2017 | Arnouse | H05K 7/1488 |
| 2019/0263396 | A1 * | 8/2019 | Arnouse | B60W 30/09 |

\* cited by examiner

*Primary Examiner* — Asad M Nawaz
*Assistant Examiner* — Syed Ali
(74) *Attorney, Agent, or Firm* — Hoffberg & Associates; Steven M. Hoffberg

(57) ABSTRACT

A local software deployment system, comprising a server, configured to: provide an access point for a wireless network; redirect an incoming request to a web page selectively customized based on characteristics of the requestor; present an option, through the wireless network, on the customized web page, to a device connected to the server through the wireless network, to download a file from the server, selectively dependent on the customized web page; and download the file from the server.

20 Claims, 1 Drawing Sheet

MESH NETWORK DEPLOYMENT KIT

CROSS REFERENCE TO RELATED APPLICATIONS

The present application is a non-provisional of, and claims benefit of priority under 35 U.S.C. § 119(e) from, U.S. Provisional Patent Application No. 62/646,684, filed Mar. 22, 2019, the entirety of which is expressly incorporated herein by reference.

FIELD OF THE INVENTION

The present invention relates to the field of venue or location-specific software deployment systems.

BACKGROUND OF THE INVENTION

Smartphone applications are increasingly a critical part of emergency response, military, and even regular civilian operations when disasters and other sensitive activities occur. Having up-to-date and broadly distributed applications can often be the difference between being able to operate effectively or not. However, absent a locked-down infrastructure, which can mandate software application synchronization, which mediates against a "bring your own device" (BYOD) paradigm, assuring that each device involved in a network, i.e., a smartphone, is executing the same application. Further, in some environments, the hardware is subject to differences, and may require programming for the location or venue in which it is intended to operate.

Due to the centralized network-based distribution models for modern smartphone applications (e.g., iOS App Store & Google Play Stores), having up-to-date and broadly accessible smartphone applications is a challenge when network connectivity cannot be assured, because regular users either do not know specialty procedures for off-network app distribution, or are simply unprepared with the proper permissions and files to do so when needed. This challenge is compounded by the fact that usually when emergency apps are needed most, like during natural disasters, is precisely when network connectivity is most likely to be unavailable leading to compromised ability to respond as many users may not have up-to-date apps or may have not installed the appropriate apps at all beforehand. This reliance on individual users always being prepared with proper applications before an emergency is a critical vulnerability for effective off-grid smartphone-based emergency operations.

An "app" is a program that executes under an operating system, typically of a mobile device, and typically which provides a limited set of functionality, and typically only though services provided by the operating system.

As mobile phone applications are usually quite large, often averaging over 50 MB, and perhaps more if mapping data is included, even if some resilient connectivity might be available, such as a satellite communications (sitcom) link, it is completely unreasonable from a bandwidth and cost perspective to download an app from the regular network. Thus, the common availability of downloadable applications for smartphones when Internet or other wide area networking communications are presumed to be impaired, is an unsolved problem.

After core applications are installed/updated, they are often in a vanilla "fresh install" mode, which may not allow full operation. This is to be expected, as most applications are designed to be installed and initialized while on a regular network connection, as such many applications often depend on additional data being delivered from a regular network connection before their application can be operated.

Although storing app files for installing on smartphones offline is a process that exists already, it has historically been a convoluted technical process requiring a high degree of technical expertise and advanced preparation to download the appropriate files on to a phone so they can be provisioned successfully offline.

A common example of critical data that is often missing when an application (or "app") is freshly installed is map data for applications that deal with geospatial information. Map data is often very large even for small local areas, so mapping apps almost never carry any detailed map data within their native app packages, instead they are more of a rendering engine and the map data must be downloaded post-installation from a server, dependent on the location or venue of interest.

It is also notoriously difficult to upgrade the firmware on electronic hardware. Outside of fully networked devices like smartphones and other general computing devices, the challenge in upgrading standalone electronics that are not fully networked, like off-grid radios or laser range-finders for example, primarily lie in the difficulty in delivering firmware upgrade files to a hardware device safely and reliably. Then depending on the capabilities built into that particular electronic device, the next challenge is executing a bootloading sequence that is either executed by the device itself, or must be run by an external updating software system.

Due to these challenges, as well as the general lack of knowledge by the public on the general topic of firmware in general, it is very common for electronic hardware devices to never have their critical software upgraded from whatever stock files were installed during manufacturing. This is very problematic as critical bug fixes and performance enhancements can be missed, or in more serious cases, can lead to compatibility breaking fragmentation of electronics that might be expected to work together in some way.

Further, many modern firmware updates are distributed via the cloud for networked and semi-networked devices, and if that cloud is gone (temporarily unavailable, or server disabled), there is usually no way to upgrade the firmware on a device off-grid unless there is some method/process to deliver new firmware files locally.

It is well known to provide page redirects for forcing a user to a local home page, rather than the universal resource locator (URL) sought by the client. The home page, in turn, permits login and/or authentication of the user to the network. In some cases, the redirected page can provide some information to the user before logging in, and without general network access. See, U.S. Patent and Published Patent Application Nos. U.S. Pat. Nos. 6,754,192; 6,763,013; 6,763,014; 6,850,511; 6,879,574; 6,894,985; 6,940,832; 6,954,435; 6,961,310; 6,975,614; 6,985,476; 7,007,102; 7,027,426; 7,058,021; 7,068,600; 7,068,605; 7,079,552; 7,085,290; 7,110,779; 7,116,661; 7,129,890; 7,142,524; 7,142,866; 7,177,295; 7,177,594; 7,190,961; 7,271,736; 7,299,038; 7,321,777; 7,339,897; 7,342,876; 7,342,907; 7,343,244; 7,356,329; 7,373,108; 7,382,765; 7,391,730; 7,394,826; 7,417,962; 7,447,174; 7,450,517; 7,453,864; 7,463,612; 7,468,954; 7,471,626; 7,480,248; 7,486,627; 7,495,687; 7,512,079; 7,512,783; 7,519,045; 7,522,547; 7,535,881; 7,542,437; 7,548,915; 7,551,892; 7,554,982; 7,570,927; 7,573,835; 7,577,107; 7,577,108; 7,577,665; 7,590,589; 7,599,665; 7,603,360; 7,606,176; 7,616,961; 7,634,230; 7,639,681; 7,643,509; 7,644,105; 7,646,754; 7,649,872; 7,653,355; 7,656,857; 7,656,879; 7,660,319; 7,660,581; 7,668,958; 7,676,394; 7,693,093; 7,693, 119; 7,693,167; 7,697,456; 7,702,318; 7,710,870; 7,715,885; 7,719,987; 7,719,988; 7,719,989; 7,733,818; 7,734,278; 7,752,209; 7,756,041; 7,764,617; 7,764,635; 7,769,764; 7,778,230; 7,787,865; 7,788,387; 7,801,058; 7,813,314; 7,813,326; 7,822,023; 7,822,384; 7,822,852; 7,840,427; 7,843,822; 7,849,139; 7,852,763; 7,852,816; 7,860,871; 7,860,968; 7,865,187; 7,876,706; 7,877,176; 7,881,340; 7,881,667; 7,890,568; 7,898,979; 7,899,455; 7,902,973; 7,907,940; 7,912,458; 7,924,745; 7,936,697; 7,944,899; 7,948,966; 7,957,355; 7,961,626; 7,965,671; 7,965,845; 7,969,914; 7,970,389; 7,974,302; 7,983,619; 7,983,662; 7,983,835; 8,005,100; 8,005,879; 8,009,648; 8,014,404; 8,018,840; 8,023,425; 8,027,273; 8,027,879; 8,041,717; 8,050,675; 8,054,762; 8,054,819; 8,060,013; 8,060,017; 8,060,389; 8,060,590; 8,064,879; 8,065,411; 8,065,419; 8,072,906; 8,072,928; 8,073,565; 8,078,139; 8,085,686; 8,090,395; 8,099,434; 8,099,505; 8,103,545; 8,115,617; 8,121,066; 8,127,039; 8,131,271; 8,131,737; 8,131,838; 8,135,021; 8,139,504; 8,144,619; 8,149,716; 8,149,733; 8,150,372; 8,150,835; 8,155,045; 8,155,711; 8,156,128; 8,156,208; 8,165,143; 8,175,585; 8,180,332; 8,180,352; 8,185,101; 8,190,938; 8,191,128; 8,194,541; 8,195,133; 8,195,513; 8,199,664; 8,200,205; 8,201,094; 8,204,800; 8,204,886; 8,209,344; 8,213,409; 8,218,511; 8,218,514; 8,219,309; 8,228,954; 8,229,440; 8,229,812; 8,229,914; 8,238,288; 8,238,888; 8,243,639; 8,244,246; 8,245,315; 8,250,207; 8,255,469; 8,255,716; 8,266,551; 8,270,310; 8,270,952; 8,270,955; 8,271,433; 8,280,308; 8,280,345; 8,285,859; 8,290,516; 8,290,810; 8,290,952; 8,296,184; 8,296,408; 8,296,413; 8,300,615; 8,301,125; 8,301,838; 8,302,030; 8,311,888; 8,315,791; 8,316,031; 8,320,879; 8,321,228; 8,321,526; 8,321,587; 8,325,612; 8,326,958; 8,331,901; 8,332,397; 8,332,624; 8,335,522; 8,335,819; 8,335,989; 8,335,990; 8,340,666; 8,341,185; 8,341,196; 8,341,279; 8,341,289; 8,346,210; 8,346,915; 8,351,861; 8,351,884; 8,351,898; 8,351,933; 8,355,337; 8,355,410; 8,359,019; 8,363,662; 8,364,521; 8,364,540; 8,369,242; 8,370,863; 8,374,170; 8,385,240; 8,385,916; 8,386,715; 8,391,401; 8,392,541; 8,396,458; 8,396,788; 8,401,191; 8,401,560; 8,401,572; 8,401,934; 8,406,153; 8,406,733; 8,407,351; 8,411,567; 8,411,590; 8,412,185; 8,422,957; 8,423,508; 8,427,508; 8,429,398; 8,433,297; 8,437,271; 8,441,989; 8,442,549; 8,447,849; 8,447,974; 8,451,744; 8,452,572; 8,452,784; 8,452,858; 8,457,067; 8,457,607; 8,457,653; 8,458,799; 8,463,249; 8,467,312; 8,467,774; 8,472,348; 8,478,667; 8,478,812; 8,479,107; 8,483,671; 8,483,674; 8,484,234; 8,484,661; 8,488,589; 8,488,783; 8,489,077; 8,489,600; 8,489,669; 8,489,765; 8,490,075; 8,490,151; 8,493,407; 8,494,500; 8,498,224; 8,498,416; 8,503,309; 8,503,363; 8,503,995; 8,504,285; 8,508,471; 8,509,088; 8,509,180; 8,509,750; 8,510,025; 8,514,829; 8,515,400; 8,515,401; 8,515,409; 8,516,552; 8,520,606; 8,520,676; 8,521,887; 8,522,341; 8,527,584; 8,527,622; 8,531,986; 8,532,633; 8,532,634; 8,538,678; 8,538,812; 8,543,143; 8,543,532; 8,543,665; 8,543,917; 8,547,232; 8,547,872; 8,547,875; 8,549,010; 8,553,688; 8,553,728; 8,554,131; 8,554,192; 8,554,251; 8,555,349; 8,559,442; 8,560,537; 8,566,020; 8,570,892; 8,570,908; 8,571,004; 8,571,467; 8,571,519; 8,576,184; 8,576,846; 8,578,015; 8,578,054; 8,582,593; 8,583,089; 8,583,781; 8,583,978; 8,588,108; 8,588,110; 8,588,126; 8,593,253; 8,593,255; 8,593,331; 8,593,986; 8,594,625; 8,595,359; 8,599,014; 8,600,402; 8,600,619; 8,600,830; 8,601,137; 8,601,380; 8,606,329; 8,606,499; 8,612,583; 8,615,505; 8,615,551; 8,615,719; 8,619,576; 8,619,789; 8,620,285; 8,621,203; 8,621,563; 8,621,656; 8,625,544; 8,626,736; 8,627,092; 8,630,177; 8,630,192; 8,630,275; 8,630,291; 8,630,611; 8,631,018; 8,631,102; 8,631,436; 8,634,348; 8,635,678; 8,639,811; 8,639,935; 8,640,198; 8,655,891; 8,660,891; 8,666,364; 8,666,376; 8,667,571; 8,675,507; 8,688,088; 8,688,099; 8,688,671; 8,695,073; 8,712,395; 8,713,589; 8,713,630; 8,718,617; 8,724,554; 8,725,126; 8,737,957; 8,737,972; 8,744,485; 8,745,121; 8,750,167; 8,750,845; 8,751,159; 8,751,644; 8,755,776; 8,756,002; 8,756,173; 8,756,449; 8,761,285; 8,762,276; 8,768,319; 8,768,865; 8,769,125; 8,769,320; 8,774,050; 8,774,147; 8,774,777; 8,777,752; 8,780,136; 8,780,953; 8,781,392; 8,782,309; 8,787,392; 8,788,369; 8,789,204; 8,792,860; 8,797,878; 8,797,908; 8,798,592; 8,798,594; 8,798,595; 8,798,634; 8,799,228; 8,799,451; 8,799,510; 8,800,010; 8,803,089; 8,803,661; 8,805,339; 8,805,598; 8,806,633; 8,810,368; 8,811,514; 8,811,942; 8,812,228; 8,812,232; 8,812,499; 8,812,526; 8,812,688; 8,812,990; 8,816,845; 8,817,665; 8,818,025; 8,818,331; 8,818,396; 8,818,397; 8,818,927; 8,819,191; 8,819,659; 8,821,293; 8,832,100; 8,839,387; 8,839,388; 8,843,395; 8,843,396; 8,849,246; 8,867,575; 8,886,162; 8,897,743; 8,897,744; 8,898,079; 8,903,452; 8,903,962; 8,924,549; 8,930,233; 8,958,773; 8,958,779; 8,984,059; 8,989,718; 8,995,968; 8,995,973; 8,995,998; 8,996,666; 8,996,688; 8,996,693; 9,000,917; 9,001,645; 9,001,676; 9,001,806; 9,001,914; 9,002,006; 9,003,488; 9,008,092; 9,008,693; 9,008,709; 9,009,810; 9,013,983; 9,014,026; 9,014,640; 9,014,914; 9,014,977; 9,015,126; 9,015,228; 9,019,846; 9,020,008; 9,020,697; 9,025,607; 9,025,767; 9,026,609; 9,030,939; 9,031,986; 9,032,053; 9,037,127; 9,037,896; 9,038,197; 9,042,816; 9,043,260; 9,043,323; 9,043,478; 9,046,376; 9,047,766; 9,049,605; 9,049,628; 9,052,208; 9,054,750; 9,055,020; 9,055,105; 9,055,425; 9,055,435; 9,055,596; 9,058,406; 9,059,929; 9,059,942; 9,063,165; 9,066,221; 9,068,839; 9,069,575; 9,071,451; 9,071,533; 9,072,100; 9,075,146; 9,075,801; 9,076,009; 9,076,175; 9,077,772; 9,078,091; 9,078,121; 9,079,311; 9,081,567; 9,082,239; 9,083,627; 9,087,284; 9,087,412; 9,088,493; 9,088,624; 9,088,643; 9,088,983; 9,090,295; 9,093,021; 9,094,049; 9,094,324; 9,094,538; 9,094,781; 9,094,853; 9,097,551; 9,098,420; 9,100,305; 9,100,772; 9,100,793; 9,100,918; 9,100,989; 9,102,330; 9,103,694; 9,103,920; 9,105,053; 9,106,268; 9,106,555; 9,106,672; 9,106,768; 9,107,058; 9,109,915; 9,110,556; 9,110,685; 9,110,939; 9,110,996; 9,112,541; 9,112,649; 9,112,805; 9,112,861; 9,112,871; 9,113,284; 9,113,371; 9,113,373; 9,115,989; 9,117,203; 9,118,539; 9,118,699; 9,119,130; 9,122,532; 9,122,693; 9,122,702; 9,123,078; 9,123,186; 9,124,304; 9,124,403; 9,124,482; 9,125,066; 9,125,211; 9,128,689; 9,129,225; 9,129,333; 9,130,863; 9,131,441; 9,132,913; 9,135,664; 9,137,739; 9,141,618; 9,143,456; 9,143,897; 9,143,912; 9,143,975; 9,144,003; 9,148,280; 9,148,373; 9,154,370; 9,154,407; 9,154,964; 9,154,982; 9,155,068; 9,159,167; 9,160,760; 9,161,158; 9,161,257; 9,166,845; 9,166,908; 9,166,953; 9,167,012; 9,167,426; 9,168,656; 9,168,882; 9,171,110; 9,171,451; 9,172,613; 9,172,636; 9,173,104; 9,176,832; 9,176,924; 9,178,772; 9,179,232; 9,179,308; 9,179,315; 9,179,316; 9,179,353; 9,179,367; 9,182,965; 9,183,552; 9,183,560; 9,185,521; 9,188,451; 9,193,367; 9,195,864; 9,195,980; 9,195,993; 9,196,087; 9,197,380; 9,197,618; 9,198,117; 9,198,203; 9,201,701; 9,201,974; 9,201,979; 9,203,609; 9,203,840; 9,204,374; 9,207,327; 9,207,843; 9,210,045; 9,210,232; 9,210,589; 9,214,988; 9,215,638; 9,215,685; 9,218,216; 9,218,381; 9,218,605; 9,219,682; 9,220,062; 9,223,481; 9,223,859; 9,223,878; 9,225,589; 9,225,616; 9,225,688; 9,225,760; 9,226,218; 9,226,339; 9,228,843; 9,229,946; 9,229,955; 9,230,104; 9,231,850; 9,231,965; 9,231,977; 9,232,352; 9,232,378; 9,232,403;

9,232,458; 9,235,268; 9,235,941; 9,236,904; 9,237,220; 9,237,593; 9,240,018; 9,240,827; 9,240,913; 9,241,248; 9,241,265; 9,244,150; 9,245,051; 9,246,586; 9,246,845; 9,246,882; 9,246,914; 9,246,983; 9,247,396; 9,247,482; 9,247,779; 9,250,686; 9,253,021; 9,253,282; 9,253,816; 9,258,034; 9,258,408; 9,261,368; 9,262,120; 9,264,349; 9,264,435; 9,266,025; 9,269,000; 9,269,059; 9,270,584; 9,270,726; 9,271,023; 9,271,178; 9,274,898; 9,275,376; 9,276,845; 9,276,931; 9,277,400; 9,277,477; 9,277,482; 9,277,503; 9,279,696; 9,280,708; 9,281,865; 9,282,059; 9,282,096; 9,286,473; 9,288,337; 9,288,630; 9,288,660; 9,288,760; 9,290,153; 9,294,141; 9,294,364; 9,294,488; 9,294,878; 9,298,362; 9,299,257; 9,300,569; 9,301,114; 9,304,009; 9,305,002; 9,306,620; 9,306,833; 9,306,841; 9,307,575; 9,311,505; 9,311,670; 9,312,918; 9,313,106; 9,313,275; 9,313,322; 9,313,539; 9,313,800; 9,314,696; 9,317,133; 9,317,378; 9,317,598; 9,319,332; 9,319,390; 9,321,529; 9,323,250; 9,324,033; 9,325,626; 9,325,693; 9,325,827; 9,326,222; 9,330,396; 9,331,744; 9,331,931; 9,332,072; 9,335,893; 9,336,320; 9,337,899; 9,338,065; 9,338,171; 9,338,725; 9,342,886; 9,344,355; 9,344,868; 9,344,894; 9,345,012; 9,347,779; 9,349,293; 9,350,533; 9,350,635; 9,350,645; 9,350,683; 9,350,809; 9,351,144; 9,351,193; 9,354,806; 9,355,144; 9,356,858; 9,356,875; 9,357,331; 9,359,018; 9,360,333; 9,361,794; 9,361,802; 9,363,166; 9,363,651; 9,369,177; 9,369,295; 9,369,351; 9,369,943; 9,370,040; 9,371,099; 9,372,092; 9,372,094; 9,374,134; 9,374,136; 9,374,281; 9,377,924; 9,378,390; 9,378,528; 9,380,586; 9,384,054; 9,384,500; 9,385,933; 9,386,139; 9,386,150; 9,386,443; 9,389,594; 9,390,091; 9,390,137; 9,390,436; 9,391,784; 9,391,878; 9,392,416; 9,392,445; 9,396,040; 9,396,603; 9,398,035; 9,398,110; 9,398,169; 9,398,453; 9,398,467; 9,401,810; 9,401,863; 9,402,189; 9,407,542; 9,407,646; 9,407,702; 9,407,706; 9,411,916; 9,412,021; 9,413,479; 9,413,643; 9,413,689; 9,413,779; 9,414,183; 9,414,348; 9,417,331; 9,417,691; 9,418,340; 9,418,346; 9,419,981; 9,423,263; 9,424,556; 9,424,672; 9,426,020; 9,426,035; 9,426,040; 9,426,228; 9,426,610; 9,426,716; 9,426,769; 9,428,054; 9,429,661; 9,432,172; 9,432,248; 9,432,312; 9,432,359; 9,432,564; 9,436,231; 9,436,300; 9,436,917; 9,439,218; 9,442,935; 9,443,204; 9,443,430; 9,444,598; 9,444,727; 9,445,639; 9,448,079; 9,448,761; 9,449,154; 9,450,642; 9,450,972; 9,450,978; 9,451,383; 9,451,472; 9,451,627; 9,454,772; 9,455,903; 9,455,991; 9,460,213; 9,460,617; 9,461,970; 9,462,040; 9,462,437; 9,465,711; 9,467,440; 9,467,925; 9,469,030; 9,471,925; 9,471,934; 9,472,159; 9,473,364; 9,473,412; 9,473,893; 9,477,664; 9,477,690; 9,477,787; 9,479,441; 9,479,963; 9,483,939; 9,485,153; 9,485,157; 9,485,174; 9,485,673; 9,488,485; 9,489,403; 9,490,419; 9,491,051; 9,491,076; 9,491,564; 9,497,215; 9,499,175; 9,500,486; 9,501,856; 9,503,359; 9,503,466; 9,503,540; 9,504,051; 9,506,763; 9,507,498; 9,507,630; 9,509,792; 9,510,132; 9,510,264; 9,510,347; 9,510,362; 9,514,472; 9,514,717; 9,515,874; 9,515,914; 9,516,025; 9,516,461; 9,518,831; 9,521,158; 9,521,621; 9,525,617; 9,525,986; 9,528,839; 9,529,603; 9,531,635; 9,532,161; 9,534,911; 9,536,074; 9,536,105; 9,536,391; 9,537,457; 9,537,593; 9,541,393; 9,544,018; 9,544,162; 9,544,220; 9,547,828; 9,547,985; 9,549,363; 9,549,364; 9,551,580; 9,552,234; 9,553,728; 9,553,772; 9,553,773; 9,553,796; 9,553,933; 9,553,945; 9,557,188; 9,557,401; 9,558,559; 9,558,660; 9,558,664; 9,558,716; 9,559,750; 9,559,918; 9,562,779; 9,563,440; 9,563,854; 9,565,108; 9,565,111; 9,565,292; 9,565,543; 9,565,549; 9,569,587; 9,569,960; 9,570,046; 9,571,604; 9,574,898; 9,577,914; 9,577,915; 9,582,166; 9,582,242; 9,582,259; 9,584,164; 9,588,498; 9,588,968; 9,589,006; 9,589,108; 9,590,692; 9,590,790; 9,590,896; 9,591,035; 9,591,429; 9,594,499; 9,596,404; 9,600,261; 9,600,494; 9,600,780; 9,602,159; 9,602,379; 9,602,420; 9,602,623; 9,602,729; 9,603,024; 9,603,097; 9,606,619; 9,608,478; 9,608,912; 9,609,459; 9,609,471; 9,609,521; 9,609,552; 9,610,944; 9,612,311; 9,612,741; 9,613,065; 9,613,406; 9,613,527; 9,614,770; 9,615,192; 9,615,264; 9,615,266; 9,615,284; 9,616,993; 9,619,076; 9,619,138; 9,622,063; 9,626,628; 9,628,362; 9,628,371; 9,628,583; 9,629,581; 9,632,664; 9,633,364; 9,634,903; 9,634,928; 9,634,982; 9,635,050; 9,635,159; 9,639,184; 9,639,273; 9,639,346; 9,639,857; 9,641,382; 9,641,542; 9,641,803; 9,641,957; 9,641,994; 9,642,027; 9,645,709; 9,645,732; 9,646,315; 9,647,494; 9,647,884; 9,648,463; 9,651,343; 9,652,720; 9,654,222; 9,654,389; 9,654,478; 9,654,509; 9,654,911; 9,660,745; 9,660,969; 9,660,975; 9,661,451; 9,664,527; 9,665,648; 9,667,423; 9,667,501; 9,667,536; 9,667,716; 9,668,087; 9,668,193; 9,672,332; 9,672,659; 9,673,511; 9,673,858; 9,674,207; 9,674,426; 9,674,698; 9,674,700; 9,675,882; 9,678,660; 9,679,064; 9,684,081; 9,684,773; 9,686,312; 9,689,680; 9,691,287; 9,692,644; 9,693,201; 9,693,375; 9,696,884; 9,697,051; 9,697,175; 9,698,864; 9,698,867; 9,698,872; 9,698,996; 9,699,281; 9,699,375; 9,699,712; 9,703,791; 9,703,892; 9,705,737; 9,705,766; 9,705,914; 9,705,929; 9,706,000; 9,706,127; 9,706,349; 9,710,222; 9,710,480; 9,710,484; 9,710,961; 9,712,433; 9,713,061; 9,715,365; 9,715,780; 9,716,528; 9,716,683; 9,719,789; 9,721,003; 9,721,105; 9,721,612; 9,722,325; 9,722,905; 9,722,909; 9,723,463; 9,723,538; 9,723,653; 9,727,751; 9,727,879; 9,728,084; 9,730,017; 9,734,321; 9,734,457; 9,734,480; 9,735,834; 9,736,056; 9,736,286; 9,736,294; 9,736,650; 9,736,651; 9,742,492; 9,747,503; 9,747,663; 9,749,410; 9,749,600; 9,749,771; 9,749,808; 9,749,979; 9,753,639; 9,754,287; 9,755,711; 9,755,740; 9,756,549; 9,758,092; 9,759,800; 9,760,243; 9,761,132; 9,761,137; 9,762,387; 9,766,089; 9,767,687; 9,769,760; 9,769,821; 9,773,345; 9,774,410; 9,774,522; 9,774,534; 9,776,587; 9,778,050; 9,778,060; 9,778,771; 9,779,102; 9,779,112; 9,781,724; 9,785,149; 9,785,305; 9,785,509; 9,785,975; 9,787,616; 9,787,759; 9,788,234; 9,792,381; 9,792,432; 9,793,948; 9,793,989; 9,794,113; 9,794,179; 9,794,797; 9,794,860; 9,794,977; 9,798,010; 9,798,586; 9,800,493; 9,800,506; 9,800,791; 9,803,986; 9,806,774; 9,807,080; 9,811,589; 9,815,476; 9,818,136; 9,818,304; 9,823,839; 9,826,345; 9,826,368; 9,826,498; 9,830,048; 9,832,242; 9,838,392; 9,838,495; 9,838,496; 9,839,027; 9,841,494; 9,842,135; 9,842,282; 9,843,534; 9,843,647; 9,843,893; 9,846,735; 9,847,889; 9,847,982; 9,848,422; 9,852,381; 9,853,669; 9,853,883; 9,854,055; 9,857,185; 9,857,897; 9,860,140; 9,860,352; 9,860,725; 9,864,572; 9,866,383; 9,866,431; 9,869,561; 9,870,429; 9,870,511; 9,870,537; 9,870,642; 9,871,588; 9,876,747; 9,880,017; 9,880,555; 9,880,735; 9,880,945; 9,881,092; 9,881,384; 9,882,804; 9,883,209; 9,883,323; 9,883,340; 9,883,369; 9,883,507; 9,886,184; 9,886,509; 9,886,795; 9,887,743; 9,887,936; 9,888,021; 9,891,058; 9,891,072; 9,891,811; 9,892,176; 9,893,985; 9,894,158; 9,894,516; 9,895,604; 9,898,244; 9,900,079; 9,900,119; 9,900,169; 9,900,342; 9,900,748; 20040267610; 20050198036; 20060022048; 20070060099; 20070060109; 20070060114; 20070060129; 20070060136; 20070060173; 20070061197; 20070061198; 20070061211; 20070061229; 20070061242; 20070061243; 20070061244; 20070061245; 20070061246; 20070061247; 20070061300; 20070061301; 20070061302; 20070061303; 20070061317; 20070061328; 20070061331; 20070061332; 20070061333; 20070061334; 20070061335; 20070061336; 20070061363; 20070073717; 20070073718;

20070073719; 20070073722; 20070073723; 20070094042; 20070100650; 20070100651; 20070100652; 20070100653; 20070100805; 20070100806; 20070118533; 20070168354; 20070192294; 20070192318; 20070198485; 20070239724; 20070260635; 20070288427; 20080009268; 20080040224; 20080040225; 20080040226; 20080177994; 20080195428; 20080214148; 20080214149; 20080214150; 20080214151; 20080214152; 20080214153; 20080214154; 20080214155; 20080214156; 20080214157; 20080214162; 20080214166; 20080214204; 20080215428; 20080215429; 20080215475; 20080215557; 20080215623; 20080242279; 20080270220; 20080270417; 20090029687; 20090031006; 20090222329; 20090234711; 20090234745; 20090234861; 20090240568; 20090240569; 20090240586; 20090313318; 20100030578; 20100057801; 20100063877; 20100076845; 20100076994; 20100082430; 20100082431; 20100094878; 20100107225; 20100121705; 20100131584; 20100138293; 20100138296; 20100145804; 20100153208; 20100153211; 20100169179; 20100188975; 20100188990; 20100188991; 20100188992; 20100188993; 20100188994; 20100188995; 20100190470; 20100191575; 20100191576; 20100191604; 20100191612; 20100191613; 20100191846; 20100191847; 20100192120; 20100192170; 20100192207; 20100192212; 20100198681; 20100211458; 20100217662; 20100217663; 20100217837; 20100287048; 20100293051; 20100312572; 20110015993; 20110015994; 20110029378; 20110029387; 20110059693; 20110106614; 20110143731; 20110143733; 20110145076; 20110153428; 20110159902; 20110177799; 20110202874; 20110258046; 20110258049; 20110275393; 20110312310; 20110313853; 20110313862; 20110320264; 20110320265; 20110320266; 20110320267; 20110320268; 20110320269; 20110320270; 20110320271; 20110320279; 20110320280; 20110320281; 20110320282; 20120004984; 20120004985; 20120004986; 20120004987; 20120004988; 20120004989; 20120004990; 20120004991; 20120004992; 20120004993; 20120004994; 20120004995; 20120004996; 20120004997; 20120004998; 20120004999; 20120005000; 20120005001; 20120005002; 20120005003; 20120005004; 20120005005; 20120005006; 20120005007; 20120005008; 20120005009; 20120005010; 20120005011; 20120005012; 20120005013; 20120005014; 20120005020; 20120010945; 20120010946; 20120010947; 20120010948; 20120010949; 20120010950; 20120010951; 20120010952; 20120010953; 20120010954; 20120010955; 20120010956; 20120010957; 20120010958; 20120010959; 20120010960; 20120010961; 20120010962; 20120010963; 20120010964; 20120010965; 20120010966; 20120010967; 20120010968; 20120010969; 20120010970; 20120010971; 20120010972; 20120010973; 20120010974; 20120010975; 20120010976; 20120010977; 20120010978; 20120010979; 20120010980; 20120010981; 20120010982; 20120010983; 20120010984; 20120010985; 20120010986; 20120010987; 20120010988; 20120010989; 20120010990; 20120010991; 20120016739; 20120016740; 20120016750; 20120016751; 20120036010; 20120041819; 20120059711; 20120059718; 20120066057; 20120066198; 20120066199; 20120069131; 20120088470; 20120089845; 20120089996; 20120130811; 20120130812; 20120134291; 20120150629; 20120167185; 20120170521; 20120173358; 20120173359; 20120173360; 20120173361; 20120173362; 20120173363; 20120173364; 20120173365; 20120173366; 20120173367; 20120173368; 20120173369; 20120173370; 20120173371; 20120173372; 20120173373; 20120173374; 20120173375; 20120173376; 20120173377; 20120173378; 20120173379; 20120179562; 20120179563; 20120179564; 20120179565; 20120179566; 20120179567; 20120179568; 20120179785; 20120185349; 20120192249; 20120195206; 20120195222; 20120195223; 20120196565; 20120197792; 20120201133; 20120203677; 20120208496; 20120209705; 20120209706; 20120209707; 20120209708; 20120209709; 20120209710; 20120209750; 20120210391; 20120214441; 20120214443; 20120215602; 20120215612; 20120215622; 20120215623; 20120215624; 20120215625; 20120215626; 20120215635; 20120215639; 20120215640; 20120221685; 20120238255; 20120239498; 20120265613; 20120270567; 20120294195; 20120330750; 20130003613; 20130005299; 20130005322; 20130006729; 20130006780; 20130012178; 20130040703; 20130045710; 20130046582; 20130053005; 20130055097; 20130066723; 20130066750; 20130072149; 20130080447; 20130080607; 20130096998; 20130097015; 20130122874; 20130124317; 20130125219; 20130130672; 20130132578; 20130133028; 20130144722; 20130144724; 20130167196; 20130215116; 20130215795; 20130227659; 20130229951; 20130231084; 20130235766; 20130238424; 20130238443; 20130239194; 20130246183; 20130250768; 20130254035; 20130275209; 20130275226; 20130275227; 20130282482; 20130282491; 20130297404; 20130304581; 20130311297; 20130325610; 20140012664; 20140012665; 20140024340; 20140025494; 20140025502; 20140046761; 20140066100; 20140073357; 20140089089; 20140098671; 20140113583; 20140113622; 20140122243; 20140129332; 20140164113; 20140164630; 20140180825; 20140181100; 20140198687; 20140199962; 20140214526; 20140214527; 20140215513; 20140235230; 20140236718; 20140237250; 20140273998; 20140309806; 20140309870; 20140309880; 20140309886; 20140309891; 20140310594; 20140310610; 20140310739; 20140315527; 20140324572; 20140344065; 20140357222; 20150019329; 20150052192; 20150074259; 20150163366; 20150163694; 20150170072; 20150195171; 20150195176; 20150195184; 20150195185; 20150195192; 20150195212; 20150195216; 20150195296; 20150195414; 20150195692; 20150195698; 20150195714; 20150200713; 20150200714; 20150200738; 20150200810; 20150200846; 20150200870; 20150200882; 20150201329; 20150201331; 20150201333; 20150206337; 20150206343; 20150207725; 20150207916; 20150208203; 20150213056; 20150213088; 20150215243; 20150215323; 20150215786; 20150219464; 20150220127; 20150220555; 20150220988; 20150222477; 20150222490; 20150223009; 20150223201; 20150226565; 20150227538; 20150228195; 20150230078; 20150230091; 20150232065; 20150237021; 20150237130; 20150237659; 20150242868; 20150244721; 20150244826; 20150245276; 20150245291; 20150248231; 20150249942; 20150253946; 20150254303; 20150254465; 20150254557; 20150254692; 20150256354; 20150256569; 20150260536; 20150264626; 20150264627; 20150268057; 20150268355; 20150269361; 20150271258; 20150276421; 20150283902; 20150287241; 20150287246; 20150288805; 20150291157; 20150293512; 20150296335; 20150298317; 20150300835; 20150303740; 20150304123; 20150308838; 20150310739; 20150311948; 20150312394; 20150312707; 20150312764; 20150312863; 20150314449; 20150316640; 20150317144; 20150317649; 20150317836; 20150318891; 20150318892; 20150318911; 20150319076; 20150319077; 20150319084; 20150319630; 20150324582; 20150326450; 20150326523; 20150326560; 20150326598; 20150326609; 20150326688; 20150326689; 20150327260; 20150327261; 20150331652; 20150331930; 20150332165; 20150333997; 20150334031; 20150334123; 20150334768; 20150338223; 20150338525; 20150339371; 20150341140; 20150341169; 20150341241; 20150341275; 20150346993; 20150347116; 20150347683; 20150350018; 20150350335; 20150350409; 20150350835; 20150356763; 20150358830; 20150363748; 20150372819; 20150372903; 20150373206; 20150373556; 20150377635; 20150378583; 20150379240; 20150380818; 20150382278; 20160006773; 20160007209;

20160012132; 20160013950; 20160019515; 20160019788; 20160020864; 20160020967; 20160020979; 20160020987; 20160020988; 20160020997; 20160021006; 20160021009; 20160021010; 20160021011; 20160021013; 20160021014; 20160021017; 20160021018; 20160021126; 20160021491; 20160021492; 20160021493; 20160021510; 20160021544; 20160021596; 20160021647; 20160026542; 20160027054; 20160028445; 20160028609; 20160028750; 20160028751; 20160028752; 20160028753; 20160028754; 20160028755; 20160028762; 20160028763; 20160029182; 20160029210; 20160033289; 20160037303; 20160040996; 20160042350; 20160043775; 20160044035; 20160046021; 20160050183; 20160050210; 20160054984; 20160063528; 20160064955; 20160066132; 20160071020; 20160073229; 20160073252; 20160073271; 20160073373; 20160077187; 20160080030; 20160081102; 20160086108; 20160087328; 20160093206; 20160094398; 20160105556; 20160105906; 20160106368; 20160110156; 20160112744; 20160112745; 20160112821; 20160114247; 20160125735; 20160127857; 20160127900; 20160127942; 20160132370; 20160132397; 20160134161; 20160134468; 20160134514; 20160134516; 20160134539; 20160138492; 20160138926; 20160140353; 20160140625; 20160142109; 20160142111; 20160142248; 20160142901; 20160144853; 20160146617; 20160147416; 20160147826; 20160148513; 20160149805; 20160149856; 20160150501; 20160150575; 20160151710; 20160154113; 20160156450; 20160156593; 20160156670; 20160157067; 20160157088; 20160159368; 20160161268; 20160162472; 20160163191; 20160169683; 20160169692; 20160169930; 20160171278; 20160171885; 20160173327; 20160174267; 20160176408; 20160178381; 20160179749; 20160179874; 20160180384; 20160180500; 20160182121; 20160182170; 20160182365; 20160182397; 20160183060; 20160183120; 20160187148; 20160187491; 20160187492; 20160187493; 20160187856; 20160189098; 20160189544; 20160195403; 20160195602; 20160197800; 20160205419; 20160210602; 20160212178; 20160212740; 20160217146; 20160219012; 20160219038; 20160219042; 20160223343; 20160224951; 20160225027; 20160225301; 20160227465; 20160231122; 20160234272; 20160234637; 20160234648; 20160239181; 20160239688; 20160241721; 20160242217; 20160247394; 20160247397; 20160248390; 20160248627; 20160248661; 20160249293; 20160253342; 20160255478; 20160258754; 20160259951; 20160260325; 20160261977; 20160265933; 20160269981; 20160275081; 20160275102; 20160277201; 20160277261; 20160277469; 20160283516; 20160285173; 20160285481; 20160285841; 20160291820; 20160291834; 20160292434; 20160292830; 20160292999; 20160293001; 20160294493; 20160294548; 20160294811; 20160300150; 20160300302; 20160308793; 20160308975; 20160316036; 20160316037; 20160323279; 20160323731; 20160328376; 20160330107; 20160330200; 20160330567; 20160330589; 20160335796; 20160341564; 20160342584; 20160342862; 20160356612; 20160357367; 20160358479; 20160359665; 20160360303; 20160364224; 20160366044; 20160366553; 20160370462; 20160373891; 20160379094; 20160379485; 20160379488; 20160380776; 20160380914; 20160381087; 20170004303; 20170011338; 20170011343; 20170011465; 20170023944; 20170025000; 20170026893; 20170032129; 20170032667; 20170034041; 20170034692; 20170039695; 20170041246; 20170041472; 20170041868; 20170046956; 20170048079; 20170048853; 20170052675; 20170053623; 20170054644; 20170054732; 20170056724; 20170059353; 20170060397; 20170069208; 20170069209; 20170072851; 20170074659; 20170074663; 20170075701; 20170076599; 20170076606; 20170078170; 20170078922; 20170080952; 20170084077; 20170093687; 20170093899; 20170094455; 20170099184; 20170099226; 20170099592; 20170099684; 20170102700; 20170102703; 20170103088; 20170103213; 20170103654; 20170105104; 20170109612; 20170111271; 20170118307; 20170118518; 20170120846; 20170124883; 20170126406; 20170126647; 20170132922; 20170134646; 20170134921; 20170134938; 20170146350; 20170146353; 20170149639; 20170149882; 20170149952; 20170150369; 20170150469; 20170161639; 20170163527; 20170164264; 20170164340; 20170166115; 20170177710; 20170180262; 20170180914; 20170181629; 20170181630; 20170181645; 20170187661; 20170193300; 20170195044; 20170195045; 20170195049; 20170195050; 20170195166; 20170195554; 20170195644; 20170206215; 20170206512; 20170206529; 20170209789; 20170215073; 20170221463; 20170223516; 20170223628; 20170228937; 20170230118; 20170230888; 20170235744; 20170237669; 20170242428; 20170243026; 20170243392; 20170244484; 20170245096; 20170255705; 20170257178; 20170264437; 20170270195; 20170270556; 20170272144; 20170272315; 20170277911; 20170279878; 20170280113; 20170280273; 20170280308; 20170280333; 20170284839; 20170286852; 20170287003; 20170288988; 20170289762; 20170295081; 20170295604; 20170300693; 20170302374; 20170302663; 20170303068; 20170318117; 20170322312; 20170323478; 20170324730; 20170324791; 20170324849; 20170332240; 20170334069; 20170339099; 20170344703; 20170345299; 20170350717; 20170352262; 20170353884; 20170353978; 20170355301; 20170364409; 20170365102; 20170366342; 20170366456; 20170367086; 20170372054; 20170372576; 20170373393; 20170373775; 20170374073; 20170374490; 20180007518; 20180012461; 20180014241; 20180025010; 20180026891; 20180032535; 20180033060; 20180037336; and 20180049043, each of which is expressly incorporated herein by reference in its entirety.

In one form factor, a MANET device comprises a housing, a MANET transceiver radio and battery in the housing, and optionally a communication port for sending or receiving information through the MANET. The communication port is optional, in that a MANET device may serve as a repeater node of the network. A key feature of MANET nodes is that they generally communicate according to a protocol that permits mobility, and this is therefore a differentiating feature from generic ad hoc networks. In order to support mobility, a MANET node (or the vehicle in which it operates) typically has a portable or self-contained power supply, and will often be programmed to support communications within a subset of all nodes which support the same protocol(s). The programming may be updated, and typically, the various nodes of a MANET should execute the same version of the protocol. Another issue for group communications is common availability of hardware. While in some cases, industry standard hardware, such as WiFi (IEEE 802.11 type) transceivers may be used to communicate in an ad hoc network, and thus users may be expected to supply their own hardware, the use of commonly available hardware according to industry standards limits the available types of communications. In particular, WiFi radios tend to have limited range, and this range may be intentionally limited in order to assure frequency reuse in adjacent regions. Thus, WiFi tends to adopt a hub and spoke model network, with a router in the hub, which bridges to another type of network. While WiFi MANETs are known, their application is limited, and long-range communications are difficult to reliably achieve. Therefore, when seeking to deploy a MANET in a new location or venue, such as for use by a number of emergency responders, groups, etc., the logistics of initial setup may be complex or difficult, and remain an unsolved problem.

An example would be server login bypass permissions and radio tuning settings for the MANET transceiver, e.g., the "goTenna Pro" app (goTenna Inc., Brooklyn N.Y.) which requires a login and radio settings files to configure external hardware before operation. Normally these permissions/settings are downloaded from a cloud server, but with a network unavailable, this app and many others would be rendered either completely or near useless.

Thus, while MANETs are known, and provide useful functions, the level of skill required for normal users to successfully deploy and operate a MANET is high, and the risks during deployment are significant.

SUMMARY OF THE INVENTION

The present technology provides a deployment system intended to address one or more of the aforementioned issues.

For example, the kit may provide a transportable server, which provides a hotspot or local area network system for various devices, and which provides a customized redirected home page for the various devices which seek to provision their smartphones with the proper applications, settings, and other data files necessary for field operation. The redirected home page may be customized based on the type of the device accessing the network, and in particular, each browser may identify the respective device and generate a customized page for that device, type of device, application, or any other use-specific contextual information. This permits, upon connection, a relatively simple and obvious pathway for providing customized updates for each device accessing the network. While it might be advantageous to provide Internet or other network access after logging in to the network, this is not required, as a key feature is the availability of downloads from a local area network server, presented automatically, in a context/need-specific manner, based on data presented by the accessing client such as operating system, host application, locale, or any other host of possible variables. This context specific presentation of the proper data and routines to provision a device offline offers a user-friendly manner to deploy offline without technical expertise which hobbles traditional attempts to solve this problem manually.

In the case of a smartphone, the download may be in the form of an "app", for example an Android app (apk file) or Apple iOS app (ipa file), accessible to the user by a hyperlink, from the local server or the like. The download may be a special file type, which is automatically recognized, authenticated, and processed/installed by the user's device, or it may be an app-specific data file requested by its appropriate application (if already on user's phone, or recently installed from the system). In some cases, a file to be downloaded is to be passed to another device, e.g., a firmware file for a peripheral, and therefore the smartphone may not specifically process the file at all. In other cases, an app on the smartphone, either pre-installed, or downloaded through the redirected page, handles further file downloads. The user device may also be a tablet, laptop, or other computational device.

This technology therefore provides a local/location/system/application/venue specific way to provide files to users, which employs an industry standard way for communications, which does not require the user to know the specific list of resources needed, or where to find them. This permits automated control by the administrator of the process with minimal end-user knowledge required.

The local server may be provided in a kit, such as a transport case with a plurality of programmable devices, to facilitate custom deployments. In a preferred embodiment, which is not limiting to the generality of the technology, the transport case has a solution to maintain rechargeable batteries of the devices in a charged, ready-to-go state. For example, the transport case may include a large battery, which can recharge the batteries within a plurality of radio devices, or a single external power supply for recharging the batteries. The transport case may accommodate, for example, 2, 3, 4, 5, 6, 7, 8, 9, 10, 12, 15, 16, 18, 20, 21, 24, 25, 27, 28, 30, 32, 35, 36, 40, 45, or 50 devices, for example.

The kit preferably comprises a local server, which stores one or more distributable copy of the application(s) as well as any desired firmware or supporting data files (such as configuration settings or map data). In a typical deployment scenario, each user has a smartphone that operates according to industry standard protocols, permits private software distribution, and provides a user interface. For example, most Android phones would meet these criteria. On the other hand, Apple restricts third-party downloads, but permits private software distribution through the iOS Enterprise Developer program.

The local server preferably acts as a WiFi access point, which is available for user's smartphones. Each user would open a WiFi connection, and be automatically presented with a "pop up" screen (e.g., captive portal) directing them to the proper resources for their context/need, or they may be redirected to the same guiding screen via a browser. Since a custom app may not yet be available to the user, a browser-based interface is provided, which may authenticate and track the users, and provide a link to a download to the user's smartphone, such as an Android "apk" file or Apple "ipa" file. Once the app is downloaded and installed, the user may interface to the local server through the app automatically, or via browser interfaces.

In a preferred embodiment, the app, after installation, may then pair the smartphone with an auxiliary device, such as a particular MANET transceiver, for example by Bluetooth communications, and check the firmware of the auxiliary device to ensure that it is properly updated. Typically, auxiliary devices are provided within the transport case and are already updated to the desired firmware version, but this is not required.

The local server may communicate with the various devices within the kit, to monitor state of battery, firmware version and capabilities, and other parameters, before deployment. The communication may be through a micro USB port or USB type C port, which provides wired charging and communications. Alternately, the local server may communicate with the devices through Bluetooth, and wireless charging. If the communications with the local server are wireless, the devices may be programmed to enter a sleep mode, and wake up periodically to report their status and return to sleep. For example, the wake cycle may be once per hour, and the communication may be one or a few packets of information. The local server may also send a hibernate commend, for example when the transport case is in transport on an airplane, to suppress spurious communications for a specified duration, e.g., 8 hours. Preferably, the local server sets wakeup timers on the devices which expire at different times, to avoid collisions at the end of the cycle. The local server, for example, can wake up for 5 minutes per hours, and program the devices to report at some time during that 5 minutes. When not in deployment/servicing mode, this system would in a preferred embodiment be synchronized and updated itself via a connection with another remote cloud server—or may also be provisioned with new files/data manually through SD cards or other digital storage mediums.

The local server may perform inventory management, by logging the identity of a user who is associated with a particular device, for example to ensure return of the hardware, and to track user who may be in the field.

In some deployment scenarios, the local server is located within range of the auxiliary device, which may be a MANET transceiver, during operation. Therefore, if the local server has a MANET transceiver associated with it, it can monitor and engage in MANET communications. Thus, the local server can archive communications, provide files to users, receive streams of communications from users, and reliably bridge the available networks. For example, the local server may be a tablet or laptop computer, and may have access to a cellular network, satcom link, wired or wireless Internet access, etc. While other nodes may also provide these services, in many scenarios, it is desired to minimize power consumption by the auxiliary devices and the smartphones, to prolong life. The local server as part of the kit may have a large battery, or may be powered by a reliable power main, and thus significantly reduced power constraints. Further, with respect to bridging to other networks, the local server and transport case may be placed in a convenient fixed location for the duration of a deployment, and thus need not be limited by mobility constraints.

The local server may in some cases be a "supernode" for the various auxiliary devices or user smartphones/devices, or otherwise have special purposes or properties, though this is not required. Indeed, in some deployment scenarios, the local server is not reliably within range of one or more devices, and therefore may have no active role during the deployment.

In some cases, the deployment kit is rented or otherwise has a use which is monitored for accountability and accounting. For example, the kit may be provided to a first responder unit on a pay-as-you-go plan, such that the usage of the devices is tracked, and the amount of usage (e.g., number of devices, amount of data, time, location, etc.) monitored and used as a basis of billing. The server may track the usage by simply monitoring when devices are removed from associated slots in the case, or by communications with each respective device after it is returned to the case. The local server can then, after deployment, report to a distant server or cloud system, the amount of usage for billing purposes. The local server can also receive diagnostic and error messages from the devices, which can be processed locally within the local server, or communicated to a distant server. For example, a battery may become weak and in need of replacement, or communication capability of a device may be impaired or degraded. Further, based on diagnostic and error messages, a different firmware may subsequently be deployed in a particular location or venue, to overcome interference or other local conditions.

The deployment kit therefore may include one or more of the following functions:

Transport of a set of auxiliary devices to a deployment site;

Transportable power for recharging batteries of the devices and/or smartphones;

Downloading of application software to smartphones;

Downloading of firmware to devices, either directly or through a smartphone;

Bridging between communication networks;

Data delivery services for the devices or smartphones during active deployment;

Storage and logging of communications;

Logging of users and association of user with respective device; and

Accounting functions.

It is therefore an object to provide a deployment system, comprising a web and file server which controls a wireless hotspot, and which generates a customized redirect page that provides one or more download links for the user device(s) or automatic presentation of appropriate data for automated processes, which may be fully customized based on the user, the browser, operating system, location, or app used to access the hotspot, the user's device type, or other factors.

Another object provides a local software deployment system, comprising a server, configured to: provide an access point for a wireless network; redirect an incoming request to a uniform resource locator (URL) selectively customized based on characteristics of the requestor; receive a request from the device, dependent on an object content associated with the uniform resource locator, through the wireless network, to download a file from the server; and download the file from the server. This permits an automated process to occur without manual involvement.

Another embodiment provides the local server in a rapid deployment kit, having a transport case; a power supply, within the transport case; a plurality of devices, configured to fit within the transport case, having a first state wherein they are maintained within the transport case, and connected to a circuit for battery charging from the power supply, and a second state wherein they are removed from the transport case and are available for mobile use.

The local server may be configured to: provide an access point for a wireless network; present an option, through the wireless network, to a device connected to the server through the wireless network, to download a file from the server; and communicate directly with the plurality of ad hoc network transceivers.

It is another object to provide a rapid deployment ad hoc network transport case, comprising: a power supply; a plurality of slots, each slot configured to accept respective hardware and having an electrical connector interface for charging a rechargeable battery in the hardware from the power supply; and a server, configured to: provide an access point for a wireless network; present an option, through the wireless network, to a user device connected to the server through the wireless network, to download a file from the server; and communicate directly with the plurality of ad hoc network transceivers through the respective electrical connector interfaces in each of the plurality of slots.

It is a further object to provide a local software deployment system, comprising a server, configured to provide an access point for a wireless network; redirect an incoming request to at least one of a web page and a uniform resource locator, selectively customized based on characteristics of the requestor; at least one of: (a) present an option, through the wireless network, on the customized web page or target of the uniform resource locator, to a device connected to the server through the wireless network, to download a file from the server, selectively dependent on the customization based on the characteristics of the requestor; or (b) a request from the device, dependent on an object content associated with the customized web page or uniform resource locator, through the wireless network, to download a file from the server; and download the file from the server. The incoming request may be for a web page, and the option presented through the wireless network, on the web page. The incoming request may also be to a uniform resource locator, and the request received from the device to download a file from the server.

It is a still further object to provide a device transport case, comprising: a battery; a plurality of slots, each slot configured to receive a respective device and having an interface for charging a rechargeable battery in the respective device from the battery; and an electrical interface for a server, configured to communicate directly with the plurality of devices through the respective interfaces for each of the plurality of slots. The system may further comprise a plurality of the respective devices, interfaced within a respective plurality of slots for charging the respective rechargeable battery of each respective device.

The hotspot or wireless network may be an IEEE 802.11 compliant network.

The transport case may be compliant with one or more of ATA spec 300, Fed Std 101C, and MIL-STD-810F.

The power supply may comprise a rechargeable battery, a 120 VAC power entry module, and/or a 12 VDC input.

The server may comprise a Linux server, a Microsoft Windows® server, an Apple MacOS server, or a Google Android server, for example.

Other objects will become apparent.

BRIEF DESCRIPTION OF THE DRAWINGS

FIG. 1 shows a rapid deployment kit according to the present invention.

DETAILED DESCRIPTION OF THE PREFERRED EMBODIMENT

The present solution provides a portable and lightweight "smart server" inside of a briefcase form factor transport case, that is capable of hosting the files that would normally hosted in the cloud, and distributed through app stores, and instead stores them locally for access and installation when the Internet is unavailable.

The present technology adds a layer of critical user-friendly intelligence that makes off-grid app deployment something that requires that the end-user have no particular technical experience. Leveraging normal WiFi hotspot technology, the local server is able to quickly establish a data connection with any smartphone using a common, industry standard wireless interface. Upon connecting over WiFi, the local server is able to automatically leverage another common smartphone interface, the "captive portal" function which enables the server to trigger a small pop-up screen on any modern smartphone.

This pop-up screen is what provides the beginning of the unique user experience. The pop up screen, effectively a mobile web browser screen, is able to detect the specific operating system of mobile device which has just connected (like iOS or Android), and use that information to present a filtered list of available applications for that operating system on a common browser screen.

The user now has to only tap on the application they wish to download on to their phone and the smart server delivers the download. For Android this is a regular file download. For Apple iOS, the smart server executes a platform-specific protocol for the installation of Enterprise-signed applications without use of the iOS Store.

As the final step, upon initiating the download, the server provides a new browser screen with operating system-specific installation instructions.

The local server is capable of also storing any requisite app-specific data like, map and settings files in its own databases. Indeed, the local server can maintain a broad range of maps, and only download a subset of the maps to the smartphone app. A properly configured client application (which would be the case after downloading from the local server and installing according to the provided instructions) that knows how to query the local server appropriately for its requisite data files, the local server can deliver those critical files to a connected user off-grid. The local server is not only able to connect to smartphones to provide services via WiFi, it is also configured to interface with other electronic devices over USB (or other available I/O ports). The deployment kit may be connected to a power and data array of e.g., 30 USB ports, to which various devices connect to for charging and optionally firmware update services.

The local server may be configured to automatically scan all ports and similar to its ability to detect iOS/Android when it connects over WiFi, it is capable of detecting and interfacing with compatible hardware over its other ports. Upon connection of a device to the local server, the local server can check the firmware status (e.g., version check) of the device. The local server will then compare the reported firmware version to an active firmware file which it has stored locally. If it finds that there is a mismatch between the firmware file it has active in the local server, and a specific unit's firmware identification, it can automatically deliver that firmware file to the device, and control the device through the update. In some cases, the device may not employ a shadow firmware update process, and therefore the device may be at risk of a failed update in an inoperative state. In this case, the local server can automatically test the firmware for errors, and reload all or a portion of the firmware that contains errors. In this case, the local server plays the role of a bootloading master device. If the device includes its own bootloader, the job of the local server ends upon delivering the firmware file as the device then takes care of the installation. However, the local server does monitor to ensure the installation was successful, and if not, can redeliver the files or trigger factory resets and other recovery mechanisms.

Operationally, when the local-server is not in "deployment mode", i.e., it its home location, it is expected to be connected through the Internet to a cloud service that provides it with its appropriate files, e.g., apps, app-supporting data, firmware, etc. For example, the transport case includes an AC power entry module, or 10-24 VDC input (e.g., 12 V nominal unregulated from a car), and is plugged in to a power main, and the local server connects through a wireless network, e.g., WiFi or 4G wireless, to the Internet or a private network. The local server may also have an SD-card slot or USB interface to permit a properly configured set of external data to be side-loaded into the local server, without requiring external communications. This allows the UI/UX services it provides to be leveraged even if the data didn't get in via the cloud beforehand. Other interfaces are of course possible.

The local server, or the transport case, may have a GPS receiver, and therefore know its location. Indeed, even if neither the local server nor the transport container have GPS, a geolocation may be obtained from the various smartphones, or manually entered through a user interface.

In some cases, the local server may interface with an optional Internet access solution, satellite hub, for backhaul, or app install validation (something iOS requires). Where the local server is set up in a command center, an HDMI port may be provided for large screen viewing of deployment data, or communications, for example. A touchscreen may also be supported. A user-developed custom application may be supported.

While the local server may be a tablet computer or laptop as discussed above, the limited functionality also permits a light-weight computer, such as a Raspberry Pi 3 model B, see en.wikipedia.org/wiki/Raspberry_Pi; elinux.org/RPi_Hub. www.raspberrypi.org/documentation/hardware/raspberrypi/README.md, each of which is expressly incorporated herein by reference in its entirety.

The local server is preferably available for arbitrary user programming, though its core functions of app and firmware distribution, are preferably isolated from optional functions. The local server may provide Ethernet (e.g., wired networking) and WiFi (e.g., wireless networking) interfacing, Bluetooth, USB for input and/or output devices, storage, video input and output, micro-SD for data storage and retrieval, audio interface, etc.

The transport case may include storage for various accessories, such as antennas, peripherals, rechargers and cables, and the like, so that all the elements needed for the deployment, except the smartphone, are provided in a single case.

The local server may also distribute other information, apps, or plugins, to the user's smartphones, separate from the device functions. The software app on the smartphone may provide a bridge to permit other apps to communicate over a network established within the venue, and thus relieve the need for the app to control all communications directly. For example, the app may bridge to the TCP/IP protocol of the smartphone. However, if this is not firewalled, the capacity of the network could be overwhelmed. Therefore, if the app permits protocol bridging, to provide a generic interface for other communications, it also implements a strict filtering and bandwidth management. The app may also communicate with the operating system and other apps on the phone using various APIs and protocols known in the art and available in, for example, an Android 7 or 8, or iOS 10 or 11, for example.

Another way to communicate between apps is through Bluetooth; while direct app-to-app communications may be limited, Bluetooth messages may be relayed to as respective device, and then returned to the smartphone, and received by a registered app for that message.

Thus, the users may have various needs, which can be fulfilled by the local server.

The preferred embodiment, shown in FIG. 1, provides:
APP DEPLOYMENT
Wirelessly install any app to your iOS and Android devices completely off-grid.
A/C & AUXILIARY POWER
Accepts A/C and auxiliary external power sources for operation and long-term storage.
LOCAL SERVER HOSTING
Integrated 64-bit 1.5 GHz Ubuntu Linux computer can support any local tactical server needs.
TOUCHSCREEN
7-inch touchscreen display enables intuitive and rapid operation.
DEVICE MAINTENANCE
Charge, transport, and automatically execute radio software updates.
COMPACT & LIGHTWEIGHT
Designed to fulfill commercial airline carry-on requirements. The kit is provided in a form factor weighing in at less than 25 pounds (11.34 kg), 19.2"×15.2"×7.3".
CLOUD SYNC
Automatically syncs with the goTenna Pro Management Portal to ensure all software is up-to-date over WiFi.
RUGGED
Secure and transport devices in a MILSPEC (e.g., MIL C-4150-J) Pelican™ case, e.g., Pelikan IM2400 Storm case, www.pelicancases.com/Storm-iM2400-P389.aspx.
POWER BANK
Built-in rechargeable power for over 30 full charges of goTenna Pro devices.
REMOTE COMMUNICATIONS
Optional integrated satellite BGAN backhaul station.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. All examples illustrate embodiments of the invention, but should not be viewed as limiting the scope of the invention.

What is claimed is:

1. A local deployment system, comprising:
a transport case;
a power supply, within the transport case;
a power entry module, within the transport case, selected from the group consisting of a 120 VAC input power entry module and a 10-24 VDC input power entry module, configured to receive electrical power into the transport case;
a memory;
a server, configured to:
provide an access point for a wireless network;
automatically determine at least one of an identity, a type, and a characteristic of a user or device accessing the wireless network through the access point;
redirect an incoming communication through the access point to a respective web page having a hyperlink, the respective web page being automatically selected from a plurality of alternate web pages, dependent on the at least one of the identity, the type, and the characteristic of the user or device; and
respond to a selection of the hyperlink with a file download from the memory, selectively dependent on the selected web page, the file download being selectively dependent on the hyperlink,
such that a user or device accessing the access point receives a customized file download selectively dependent on an automatically determined respective identity, type, or characteristic, substantially without a targeted input by the user or device of an address of the web page;
a plurality of electronic devices comprising rechargeable batteries, configured to fit within the transport case, having a first state wherein they are maintained within the transport case, and connected to a circuit for battery charging from the power supply, and a second state wherein they are removed from the transport case and are available for mobile use.

2. The local deployment system according to claim 1, wherein the file download comprises an executable program.

3. The local deployment system according to claim 2, wherein the executable program comprises software selectively authenticated for a respective type of device.

4. The local deployment system according to claim 2, wherein the executable program comprises software selectively authenticated for a respective device.

5. The local deployment system according to claim 2, wherein the executable program comprises software selectively authenticated for a respective user.

6. The local deployment system according to claim 1, wherein the wireless network is an IEEE 802.11 compliant network.

7. The local deployment system according to claim 1, wherein server comprises a Linux server.

8. The local deployment system according to claim 1, wherein the transport case is compliant with ATA spec 300.

9. The local deployment system according to claim 1, wherein the transport case is compliant with Fed Std 101C.

10. The local deployment system according to claim 1, wherein the transport case is compliant with MIL-STD-810F.

11. The local deployment system according to claim 1, wherein the power supply comprises a rechargeable battery.

12. The local deployment system according to claim 1, wherein the power entry module comprises a 120 VAC input power entry module.

13. The local deployment system according to claim 1, wherein the power entry module comprises a 12 VDC input power entry module.

14. The local deployment system according to claim 1, wherein the respective electronic devices each comprise a mobile ad hoc network transceiver.

15. A local deployment method, comprising:
providing a server having a memory, within a transport case having a power supply and a power entry module, selected from the group consisting of a 120 VAC input power entry module and a 10-24 VDC input power entry module, receiving electrical power into to the case;
a plurality of electronic devices comprising rechargeable batteries, configured to fit within the transport case, having a first state wherein they are maintained within the transport case, and connected to a circuit for battery charging from the power supply, and a second state wherein they are removed from the transport case and are available for mobile use;
providing an access point for a wireless network;
automatically determining at least one of an identity, a type, and a characteristic of a user or device accessing the wireless network through the access point;
redirecting an incoming communication through the access point to a respective web page having a hyperlink, the respective web page being automatically selected from a plurality of alternate web pages, dependent on the at least one of the identity, the type, and the characteristic of the user or device; and
responding to a selection of the hyperlink with a file download from the memory, selectively dependent on the selected web page, the file download being selectively dependent on the hyperlink,
such that a user or device accessing the access point receives a customized file download selectively dependent on an automatically determined respective identity, type, or characteristic, substantially without a targeted input by the user or device of an address of the web page.

16. The method according to claim 15, wherein the file download comprises an authenticated executable program.

17. The method according to claim 15, further comprising:
providing a transport case having power supply, and a plurality of electronic devices comprising rechargeable batteries, configured to fit within the transport case, having a first state wherein they are maintained within the transport case, and connected to a circuit for battery charging from the power supply, and a second state wherein they are removed from the transport case and are available for mobile use; and
establishing a wireless ad hoc network between the plurality of electronic devices in the second state.

18. A local deployment system, comprising:
a server having a memory;
the server and memory being disposed within a transport case having a power supply and a power entry module, selected from the group consisting of a 120 VAC input power entry module and a 10-24 VDC input power entry module, receiving electrical power into to the case;
a plurality of electronic devices comprising rechargeable batteries, configured to fit within the transport case, having a first state wherein they are maintained within the transport case, and connected to a circuit for battery charging from the power supply, and a second state wherein they are removed from the transport case and are available for mobile use;
a wireless network access point having an associated web page server, configured to:
automatically determine a characteristic selected from the group consisting of an identity, a user type, and a device type;
redirect an incoming communication through the access point to a web page including a hyperlink, the respective web page being automatically selected from a plurality of alternate web pages, dependent on the automatically-determined characteristic; and
download a file to a wireless network-connected device from the memory, selected from a plurality of files, selectively dependent on the respective web page,
such that the wireless network-connected device receives a file download dependent on the automatically determined characteristic, substantially without a targeted input of an address of the respective web page.

19. The local deployment system according to claim 18, further comprising:
a plurality of electronic devices, each file having a downloaded respective file; and
the plurality of electronic devices being configured to establish a wireless ad hoc network, selectively dependent on the respective file downloaded to each of the plurality of electronic devices.

20. The local deployment system according to claim 18, wherein the downloaded file is adapted to control an interaction of the wireless network-connected device with respect to at least one of the electronic devices.

* * * * *